July 28, 1964
R. SHOFER
3,142,267
FOOD DISPENSER
Filed April 7, 1961
8 Sheets-Sheet 2
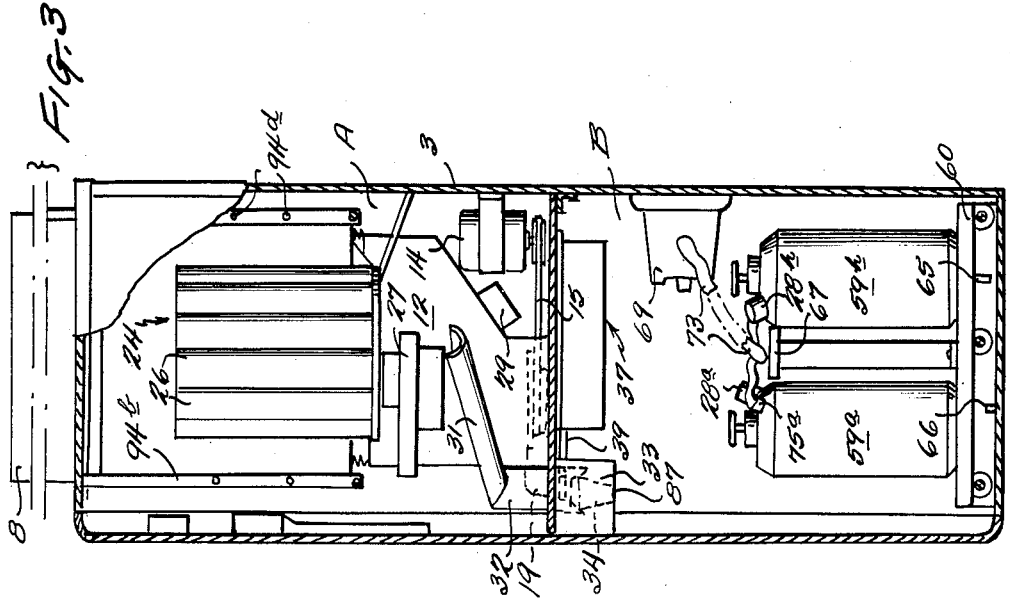
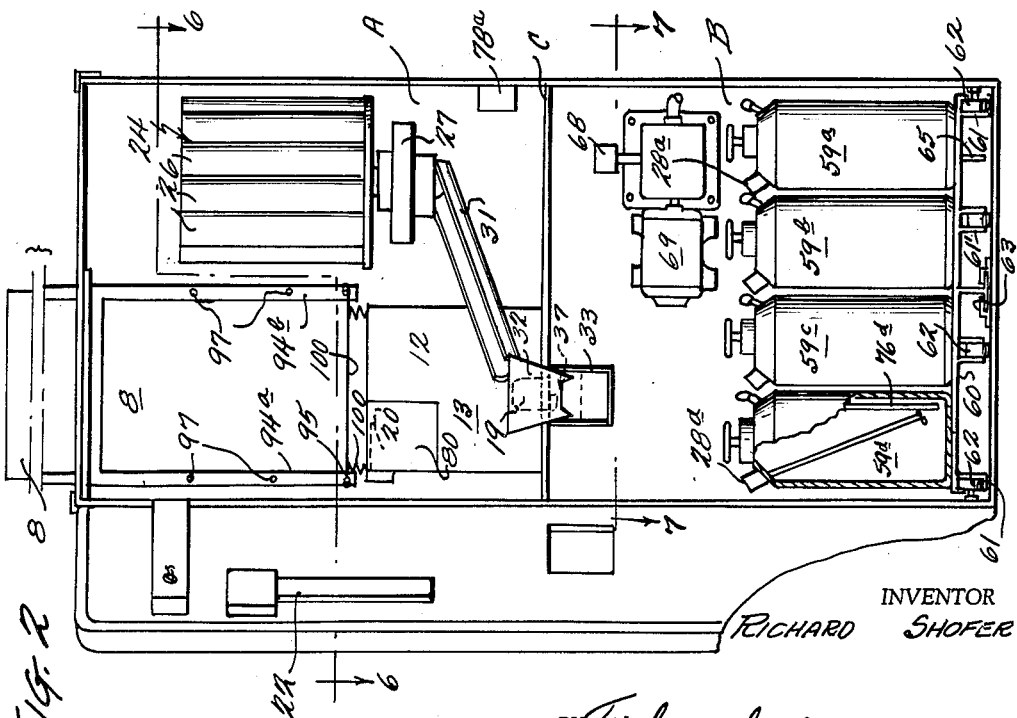
INVENTOR
RICHARD SHOFER
BY Fisher Christen & Goodson
ATTORNEYS

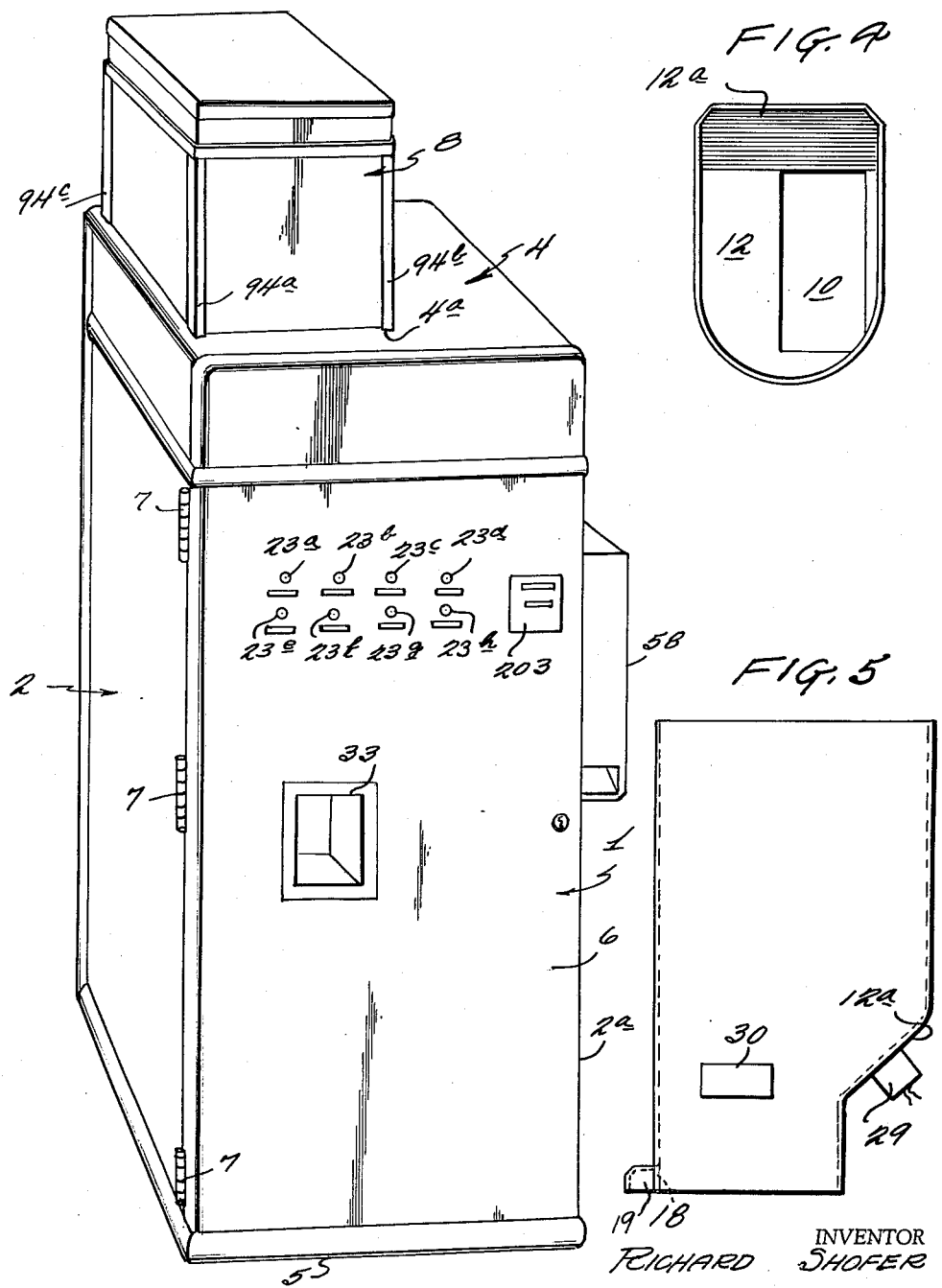

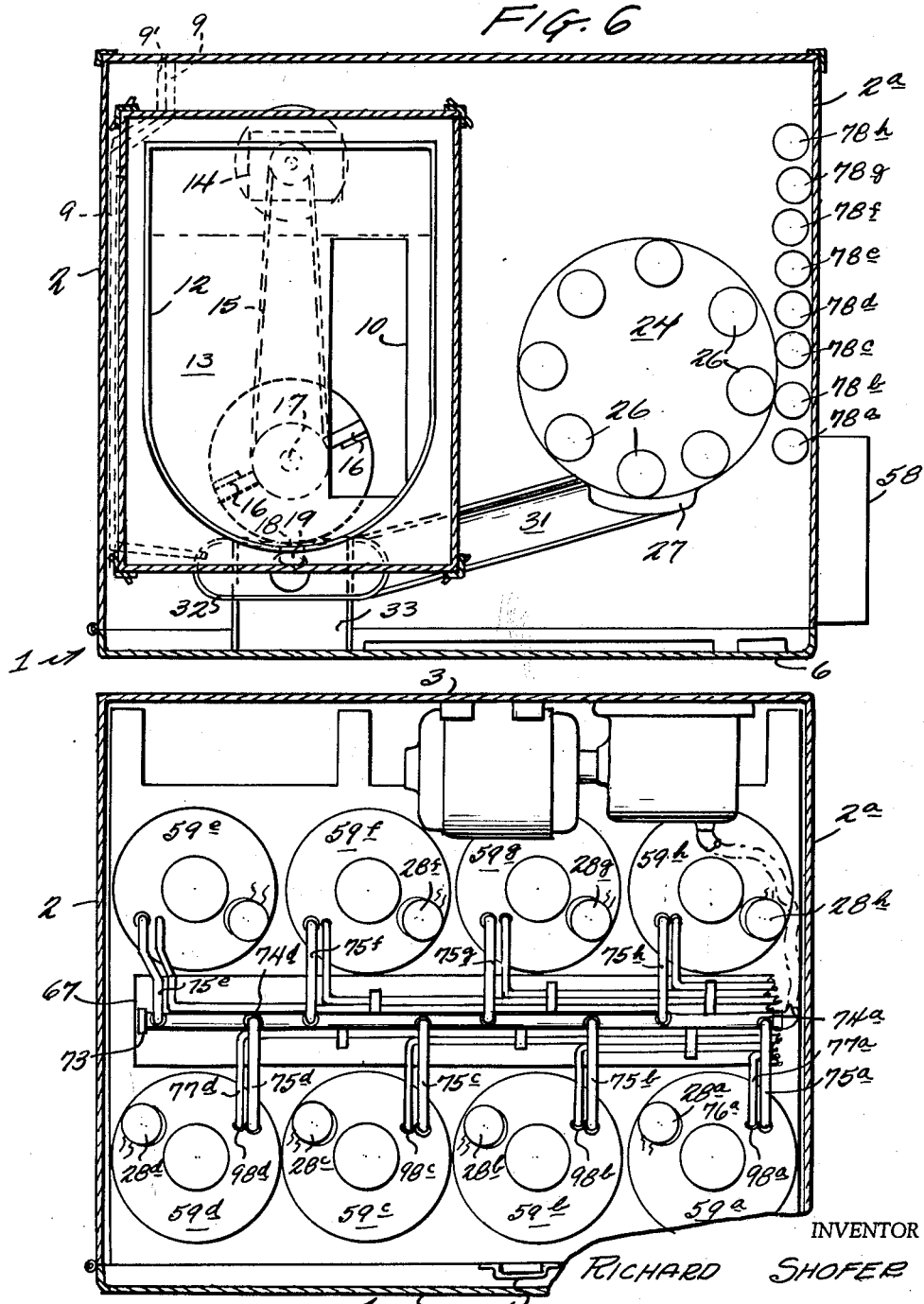

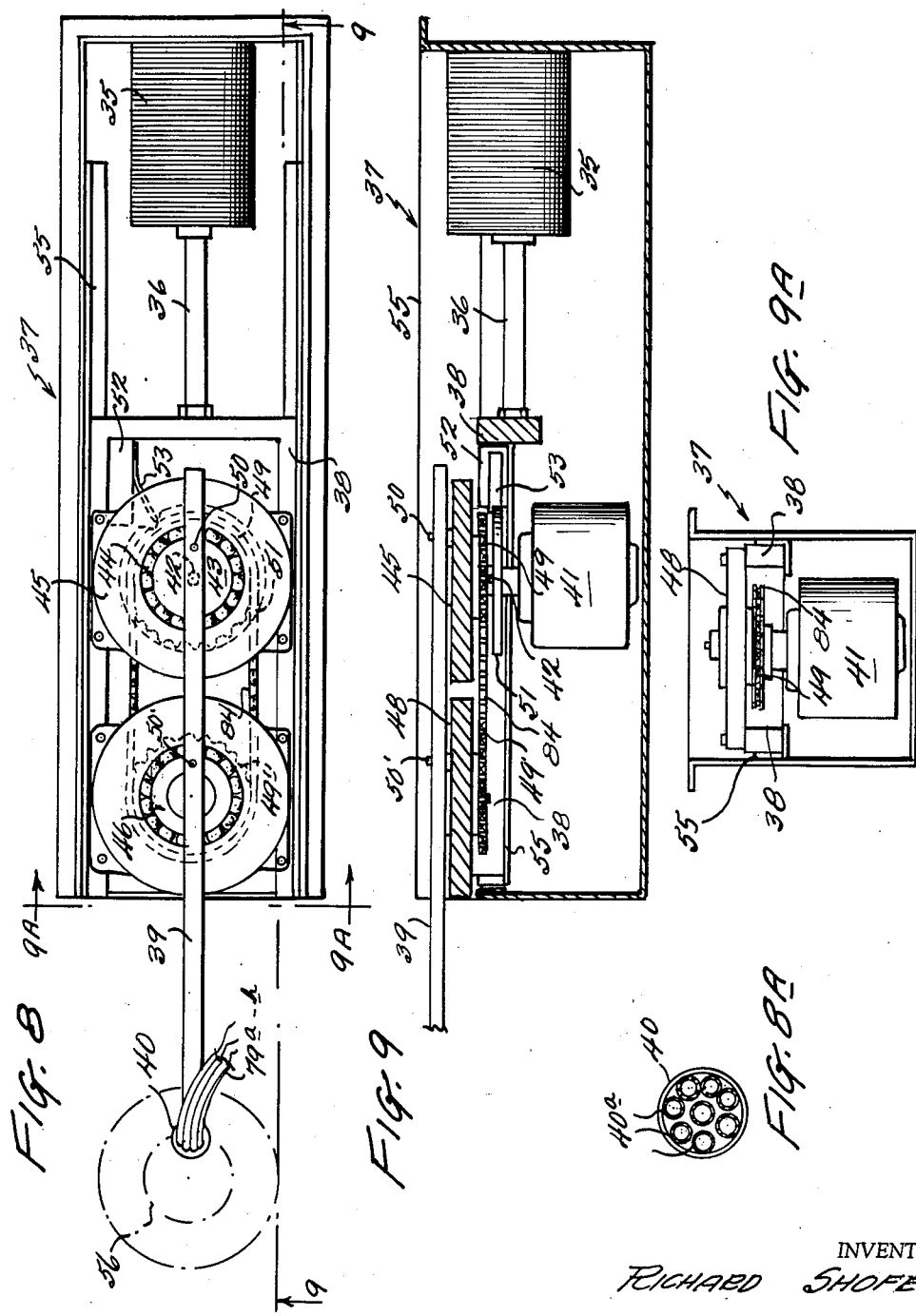

July 28, 1964 R. SHOFER 3,142,267
FOOD DISPENSER
Filed April 7, 1961 8 Sheets-Sheet 5

INVENTOR
RICHARD SHOFER

BY Fisher Christen & Goodson
ATTORNEYS

United States Patent Office 3,142,267
Patented July 28, 1964

3,142,267
FOOD DISPENSER
Richard Shofer, 3913 Seven Mile Lane, Baltimore, Md.
Filed Apr. 7, 1961, Ser. No. 127,756
8 Claims. (Cl. 107—1)

This invention relates to a coin activated food vending device and particularly relates to a vending device which automatically prepares and dispenses a commodity, known in the trade as a Sno-Ball, in response to a coin activated signal. A Sno-Ball is comprised of shaved ice in a cup or other suitable container having a thick syrup of a desired flavor dispersed therethrough. Heretofore, such a commodity was manually prepared by a vendor having an ice shaving mechanism and individual containers of syrup. The ice was placed in the cup and the syrup poured uniformly over the shavings so as to disperse itself and thereby flavoring and coloring. The making of such a commodity did not lend itself to automatic controls because a Sno-Ball of good quality can only be prepared from freshly shaved ice and the commodity must, by its very nature, be inexpensive.

Therefore, a primary objective of this invention is to provide a rugged automatic food vending machine, relatively inexpensive to manufacture, and capable of preparing a Sno-Ball of high quality upon an activating signal.

Another important objective of this invention is to provide means to shave and dispense a single serving of ice shavings upon the insertion of proper coins.

A further objective of this invention is to provide means whereby the syrup, for use in such a machine, is maintained in an agitated condition by a series of time operated controls. The agitating means are provided with means to insure that air bubbles will not flow through the dispensing conduits.

A further objective is the elimination of prepressurized gas containers by the use of an air compressor for automatically maintaining the desired pressure in the containers of this machine.

A still further objective of this invention is to provide a means whereby the syrup, which is dispensed over the ice, is distributed over the entire surface of a particular serving, but is so constructed and operated as not to interfere with the container dispensing apparatus.

A still further objective of the invention is to provide storage in the described vending machine wherein the syrup storage containers may be readily removed from the confines of the machine for servicing or refilling. This objective is accomplished in part by a support board for carrying all conduits, electrical and fluid, to the pressurized containers.

Another important objective of the invention is to provide a vending machine, of the type described, with the ability to accept ice storage bins of various sizes for use in different environments of use, especially where low room ceilings are involved.

Various other objects and advantages of the invention will hereinafter become more fully apparent from the following description of the drawings, illustrating a presently preferred embodiment thereof, and wherein:

FIG. 1 is a front perspective view of the cabinet of this invention;

FIG. 2 is a front interior elevational view with the door of the cabinet open;

FIG. 3 is a right side elevational view of the interior of the cabinet;

FIG. 4 is a top view of the ice storage hopper;

FIG. 5 is a side view of FIG. 4;

FIG. 6 is a plan sectional view along the lines 6—6 of FIG. 2;

FIG. 7 is a plan sectional view along the lines 7—7 of FIG. 2;

FIG. 8 is a partial diagrammatic view of the syrup dispensing system;

FIG. 8A is a bottom view of the nozzle thereof;

FIG. 9 is a sectional view along the lines 9—9 of FIG. 8;

FIG. 9A is a sectional view along the line 9a—9a of FIG. 9;

Description

Figure 11:
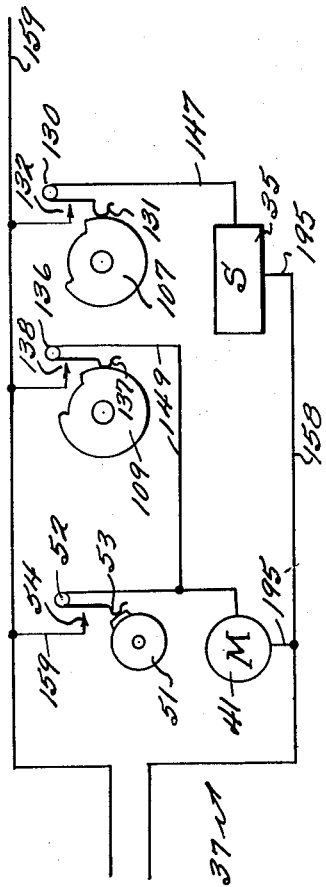
FIG. 11 is a partial electrical diagrammatic view of the cam operating parts.

Referring now to the drawings wherein like numerals indicate like elements, the numeral 1 indicates the cabinet for housing the vending machine of this invention. The cabinet is generally rectangular and consists of a pair of side walls 2 and 2a, a back wall 3, a top 4, and a bottom 5. The front of the cabinet is sealed by a door 6 which is hingedly connected to side wall 2 by a plurality of hinges 7. The top 4 has a rectangular opening 4a therein to slidably receive an ice maker unit 8. The cabinet is normally situated in a permanent location wherein a permanent water supply may be connected to the ice making unit by a flexible conduit 9 having its inlet 9' mounted in back wall 3 (FIG. 6).

The ice maker is one of conventional design and preferably, but not necessarily, provides ice to the machine in cube form. The cabinet is divided basically into upper and lower compartments A and B by framing structure C. As will be described in more detail hereinafter, the ice making unit is vertically adjustable within compartment A so that the machine may be adapted for use in basements or other environments where low ceilings are often encountered.

Spaced below the ice making unit is an ice shaving mechanism 13. The shaving unit may be of conventional design and preferably has the operating characteristics of the machine patented by R. R. Smith in 1938 (Re. 20,952). The prior art shavers, such as Smith discloses, are not provided with a hopper suitable for use in the invention disclosed herein. The prior art hoppers do not have a suitable capacity or design for operational effectiveness within the combination of this invention.

Referring now to FIG. 2, as cubes are provided from ice maker 8, they are fed to hopper 12 through an opening 10. As seen best in FIG. 5, the hopper near its bottom becomes generally conical having one side wall thereof curved and slanted at 12a. Normally, ice may be made at a faster rate than it is being called for in this machine and, therefore, the hopper 12 with its enlarged body section will build a sizable supply of cubes for those periods of the day when the machine is most active. A conventional storage bin thermostatic electric switch is provided so that the ice making machine will be deactivated when hopper 12 has reached its capacity. When the ice in the storage hopper drops below the desired level, the ice maker will be activated and replenish the supply.

The invention gives the customer a choice of syrup flavors for use with the ice dispensed from shaver 13. As will be more fully described below, the machine also provides a system for controlling the flow, amount and timing of the syrup to be dispensed. Also sequentially controlled are the cup and spoon supplies, and the means by which the syrup is uniformly dispensed over the ice shavings when in their containing cups.

The coin control mechanism is of a conventional design and is designated by the numeral 22 in the instant embodiment. A plurality of buttons 23a–23h are provided so that a purchaser may select the flavor Sno-Ball desired.

It is believed that the invention will be best understood by a general sequential description of the functional events as they occur, followed by a description of the structure necessary for each event. Subsequently, a more detailed description of the electrical circuitry and syrup flow, and the casual effects of each event, will be explained to connect the rather independently described sub-systems.

Upon insertion of a coin in slot 203, a conventional cup dispenser 24 is activated and dispenses from one of a series of tubes 26 thereon a single cup via chute 31 to a cup receiving station 33. Station 33 is the position at which the cup will receive its food ingredients. The cup housing and dispensing mechanism is operated by a timer motor 25 (shown only in FIG. 12) via pinions. Cup dispensers of this type are well known in the art, and the importance thereof, to this invention, resides only in the timing, sequence of operation, and its placement.

Figure 12:
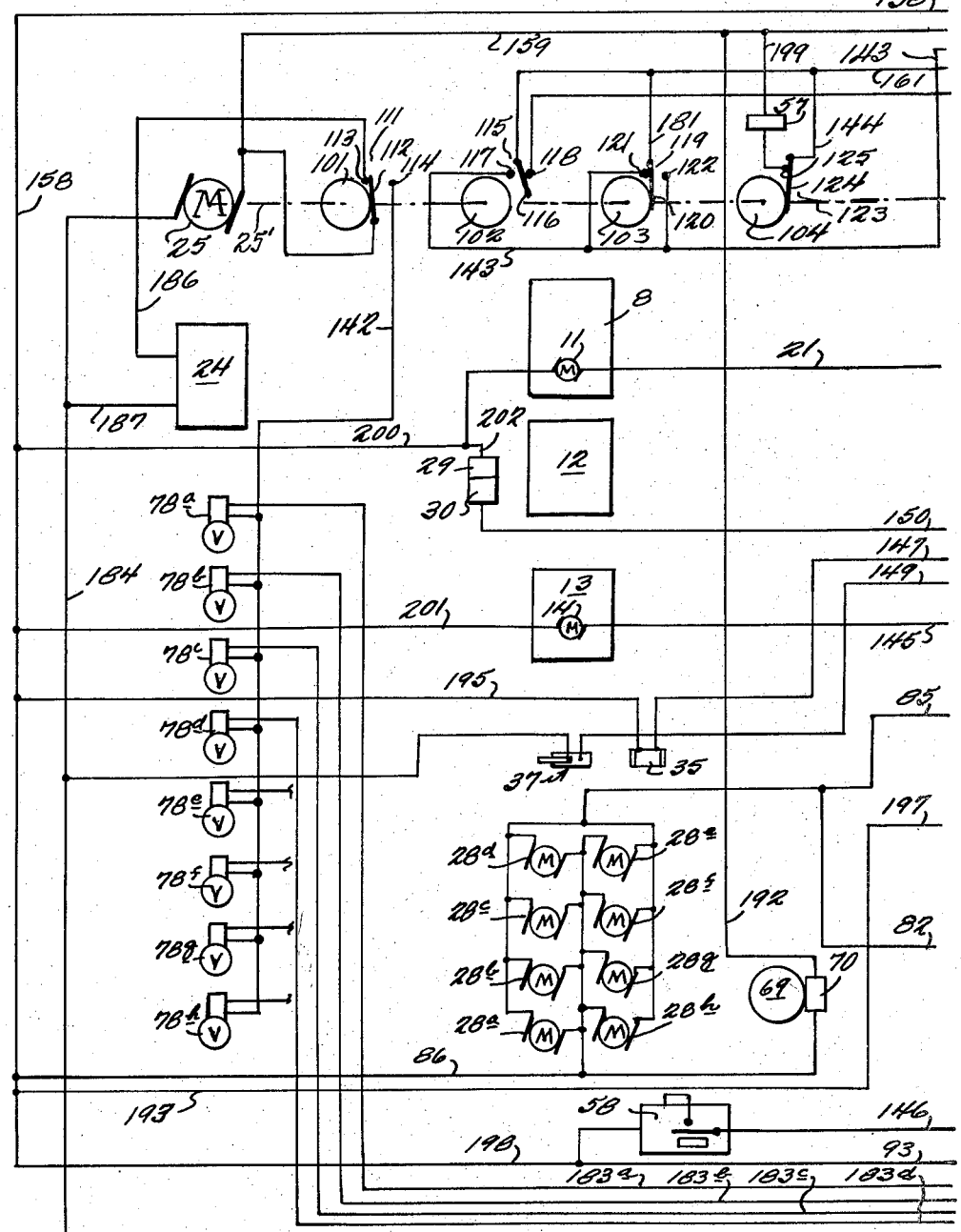
FIGS. 12 through 14 disclose the electric circuitry for use with the invention.

During the interval the cup is dropping from its housing to station 33, a pair of hopper vibrators 29 and 30 (see FIG. 5) are activated. The vibrators insure proper placement of the ice within the hopper to insure the proper working of the shaving mechanism 13, so as to insure equal servings. The vibrators diagrammatically shown in FIGS. 12 and 5 are electrically operated and produce vibrations of sufficient amplitude to disturb the cubes of ice within the hopper. Since the machine will, at times, have periods of inactivity, such vibrations insure proper feeding to the shaving assembly. After a predetermined length of time, the vibrators 29 and 30 are deactivated and the motor 14 of ice shaver 13 is activated. A belt 15 is operatively connected to shaft 17 which rotates the shaver blades 16 of the shaving assembly. As the blades rotate, the shaved ice is dispensed through a slot 18 and is directed by shield 19 into a chute 32 delivering same into a cup 34 residing at station 33 upon a surface 87 thereof (FIG. 3).

The amount of ice dispensed is determined by the length of time the shaver 13 is operated. Immediately after the desired amount of ice is dispensed, the motor 14 is deactivated and a syrup dispensing assembly 37 (see FIGS. 8 and 9) is activated.

The syrup dispensed by mechanism 37 comes from a plurality of syrup tanks 59a–59h. As will be later described, a valve and electrical system for selecting the proper syrup is provided. The mechanism 37 provides a means to route an arm 39, and a dispensing head or nozzle 40 attached thereto to a movement given by solenoid 35. The mechanism 37 is basically a two position device which is normally in a first retracted position and upon each sequence of operation moves its nozzle 40 in a circular path over station 33 which in effect is its second position. As arm 39 moves forward over cup 34, a selected syrup valve 78a opens and the selected syrup is dispensed from nozzle 40. A motor 41, positioning dispensing arm 39, is energized causing the nozzle 40 to follow a circular path 56 above the cup. Upon completing its circular path, the selected valve is closed, syrup dispensing is stopped, and the arm 39 is retracted to its first position. The nozzle 40 is comprised of a plurality of sections of metal tubes 40a connected to plastic conduits leading from the syrup containers.

At the end of the syrup dispensing interval, a spoon is dispensed from cabinet 58. This spoon dispensing mechanism is a solenoid operated device and effectively signals the purchaser that the Sno-Ball preparation is completed. The individual components of the system will now be described in more detail.

*Syrup Container Support and Associated Structure*

The vending machine is provided with a time clock 99 having two main functions. It first serves to activate the vibrators 29 and 30 on the ice storage hopper 12 at predetermined intervals. These activations are in addition to the vibrations administered prior to each dispensing sequence. As previously mentioned, the vibrators will prevent any possibility of ice cubes sticking together, or to the sides of the hopper 12, in the event that the machine is not used for several hours. Secondly, the time clock serves to activate the syrup mixer motors 28a–28h at predetermined intervals. It is important that the syrups be stirred occasionally since certain ingredients in suspension have a tendency to settle over a period of time. (Note that the blades of the agitators are near the bottom of their respective tanks.) Means are provided to shut these agitators off, in the event they are operating during a dispensing cycle.

In addition, an electric switch 81 is provided for manual control of the mixer motors 28a–28h. This feature will permit the vending machine operator to mix his own flavoring in the tanks 59a–59h when desired.

Figure 10:
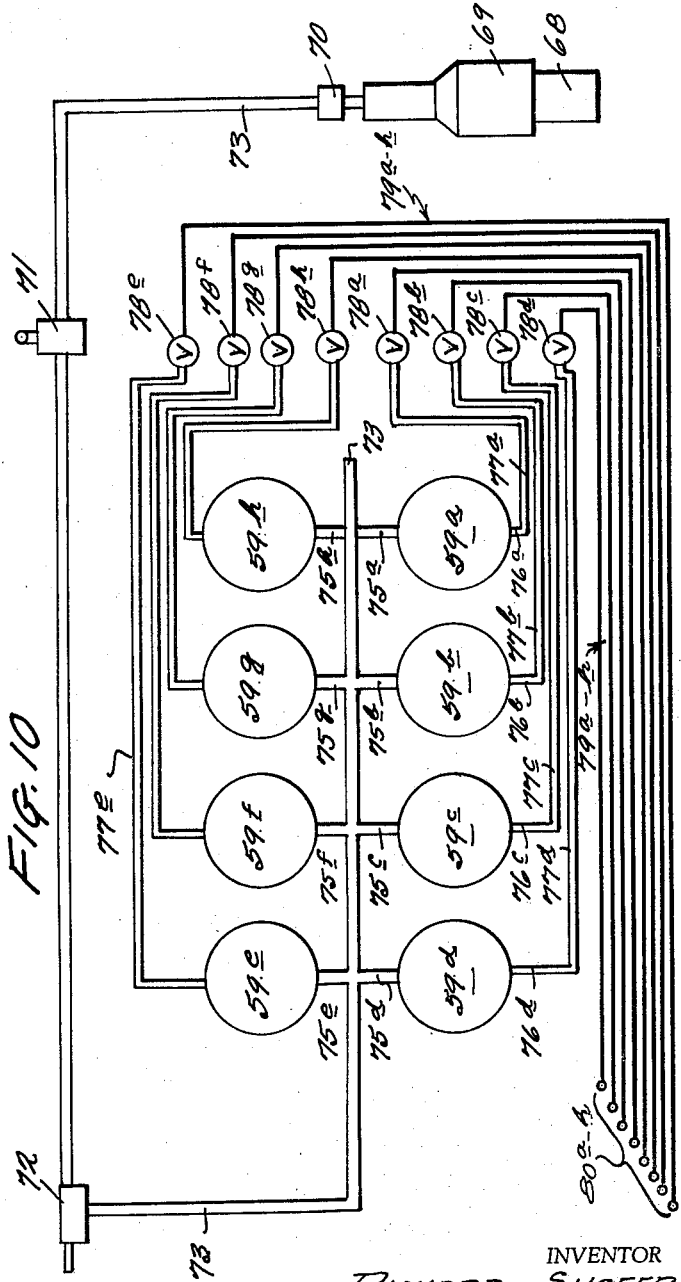
FIG. 10 is a partial diagrammatic view showing the syrup flow assembly.

The individual flavoring fluids are stored in pressurized syrup tanks 59a–59h. These tanks, together with their syrup, are quite heavy and are normally difficult to handle as for example in refilling, cleaning or servicing. To solve the problem of servicing the syrup tanks, the machine of this invention provides a novel support arrangement. The tanks 59a–59h are situated on a rigidly constructed platform 60. The platform 60 has a pair of tracks 61 receiving side roller bearings 62. In addition, it has a pair of depending inner tracks 61' receiving a roller bearing 62. A center inverted T-shaped guide track is received by a channel groove 63 to directionally steer the platform. When the person servicing the machine pulls handle 64, the platform 60 supported on rollers 62 will slide easily along the rail 63. A removable metal peg-type projection 65 attached to the platform 60 will strike another metal projection 66 when the platform 60 is pulled to the desired position. The platform 60 can be completely removed, however, by removing the top stop projection 65. Because of this slidable feature, the connections between the syrup tanks and the dispensing mechanism must be constructed in a manner permitting such movement. This is accomplished by providing a tubing platform 67 between the two rows of containers. Secured to this platform 67 are the syrup delivery tubes, the electrical wiring for mixer motors 28a–28h, and tubing between the interior of the containers and an air compressor unit. Therefore, there are three conduits necessary for each cylinder—a syrup tube, an air pressure tube, and a set of electrical wires. The dispensing of the syrup is accomplished by maintaining the cylinders under constant air pressure via air compressor 69. Referring to FIG. 10, it can be seen diagrammatically that air is drawn into the compressor 69 through a germicidal air filter 68, designed to filter both bacteria and dirt particles from the air before it enters the compressor. After the air leaves the compressor, it passes through an unloading check valve 70 and through an electrical air pressure regulator 71. The regulator maintains a pre-determined pressure in the syrup tanks 59a–59h by electrically controlling the operation of the air compressor activating switch. The compressed air passes through the manifold conduit 73 (supported on platform 67) and a safety relief valve 72. Valve 72 is designed to open automatically or manually when desired pressures are exceeded. The air passes from manifold tube 73 into branch tubes 75a–75h which lead directly into their corresponding tanks 59a–59h. The branch tubes 75a–75h are connected to the manifold tube 73 by means of flare couplings such as 74a and 74d (FIG. 7). Air pressure forces the syrup out of the syrup tanks through tubes 76a–76h which each extend from near the bottom of the tanks through the top thereof. Tubes 76a–76h are connected to individual syrup tubes 77a–77h by means of flare couplings such as 98a–98d connecting tubes 76a–76d to tubes 77a–77d. The syrups pass through the individual tubes 77a–77h which are mounted on the tube platform 67 and extend along the wall 2a of the cabinet to a plurality of respective solenoid dispensing valves 78a–78h. Flexible tubes 79a–79h are connected to the outlet end of the solenoid valves through which the syrup flows. These last mentioned tubes are terminated in a cluster 80a–h on the syrup dispensing head 40. This is best seen in FIG. 8A.

The flexible tubes 79a–79h are of a heavy gauge plastic capable of withstanding the repeated motion of the syrup dispensing arm 39. Of course, all conduits are of a sufficient length to permit platform 60 to extend to its safety stops.

The individual syrup mixer motor leads (FIG. 12) are connected to trunk leads 85 and 86 by means of fuse-holding bayonet connections of a conventional design. In the event one or more tanks are to be removed, it is done easily by opening the bayonet connections and the flare couplings of the particular tanks to be removed. The parts of the flare couplings connected to the air pressure manifold line 73 and syrup lines 77a–77h can then be capped with threaded caps provided for this purpose. In this way the air pressure system and the syrup system can easily be kept pressure tight with any number of the tanks removed.

*Adjustable Storage*

The machine is constructed so that an ice storage hopper 12 of different sizes and capacities can be easily installed while the machine is on location. Referring to FIG. 2, the ice making unit 8 is supported by four holding pins 95 extending from four angle iron supports 94a–94d. The pins are supported by the angle irons by means of holes 97 placed in each of the flanges of the irons at equal intervals. These intervals correspond to storage hopper sizes available in the market place. A lifting jack, which can be attached to the angle iron support 94a of the machine, is provided with each machine. The jack is designed so that its lifting arm will rest under the base 100 of the ice making unit 8. By operating the jack the ice making unit can be lifted off the holding pins 95 and into a new position at a different height. The pins are reinserted at the desired height. For servicing, the ice making unit 8 can be raised entirely out of the machine. If the purpose of lifting the ice making unit is to install a different storage hopper, the following procedure is used. The ice maker 8 is lifted by means of the jack, the holding pins are removed, and the new hopper is installed in the vending machine. The holding pins are then placed back in the proper holes 97 in the supports. After the holding pins are replaced, the ice making unit is then lowered, by means of the jack, into its new position sitting on the holding pins and directly above the new hopper. The base 100 of the ice making unit sits rigidly on the holding pins 95. The ice making unit can be put in a lower position by the same method. It follows that a larger ice storage hopper will mean that the vending machine can build up a larger reserve of ice for periods of time when the demand for ice exceeds the rate it is made. A door 80 is provided in the hopper to supply or extract ice as desired by an operator. Since the ice making unit is situated above the storage hopper, the overall height of the machine will depend partially upon the height of the hopper. Consequently, various sized hoppers are used where there is an overhead space problem. An annular bellows 100' connection between the bottom of the ice maker and the top of the hopper preserves limited communication between the two units.

*Operation*

Figure 13:
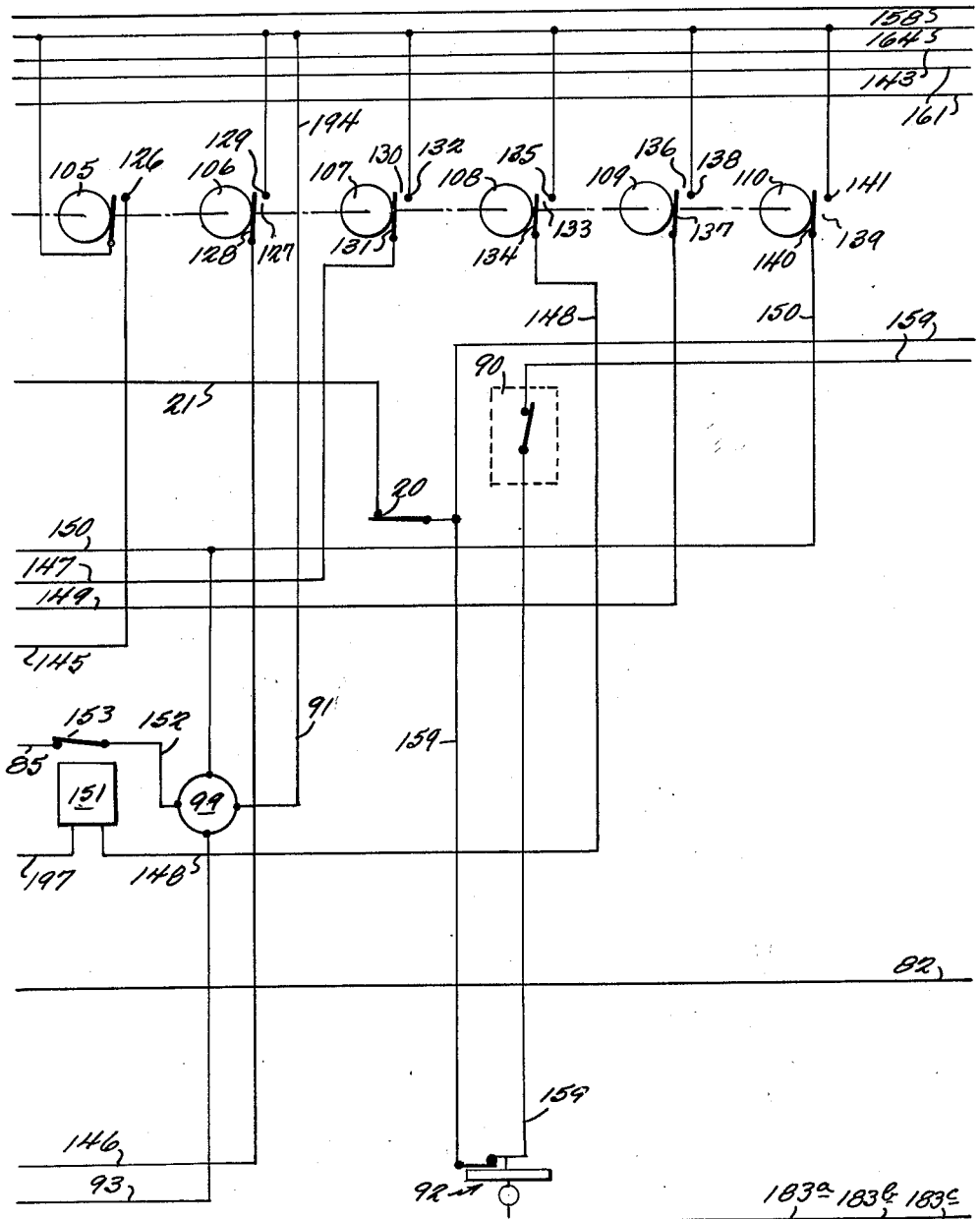
Figure 14:
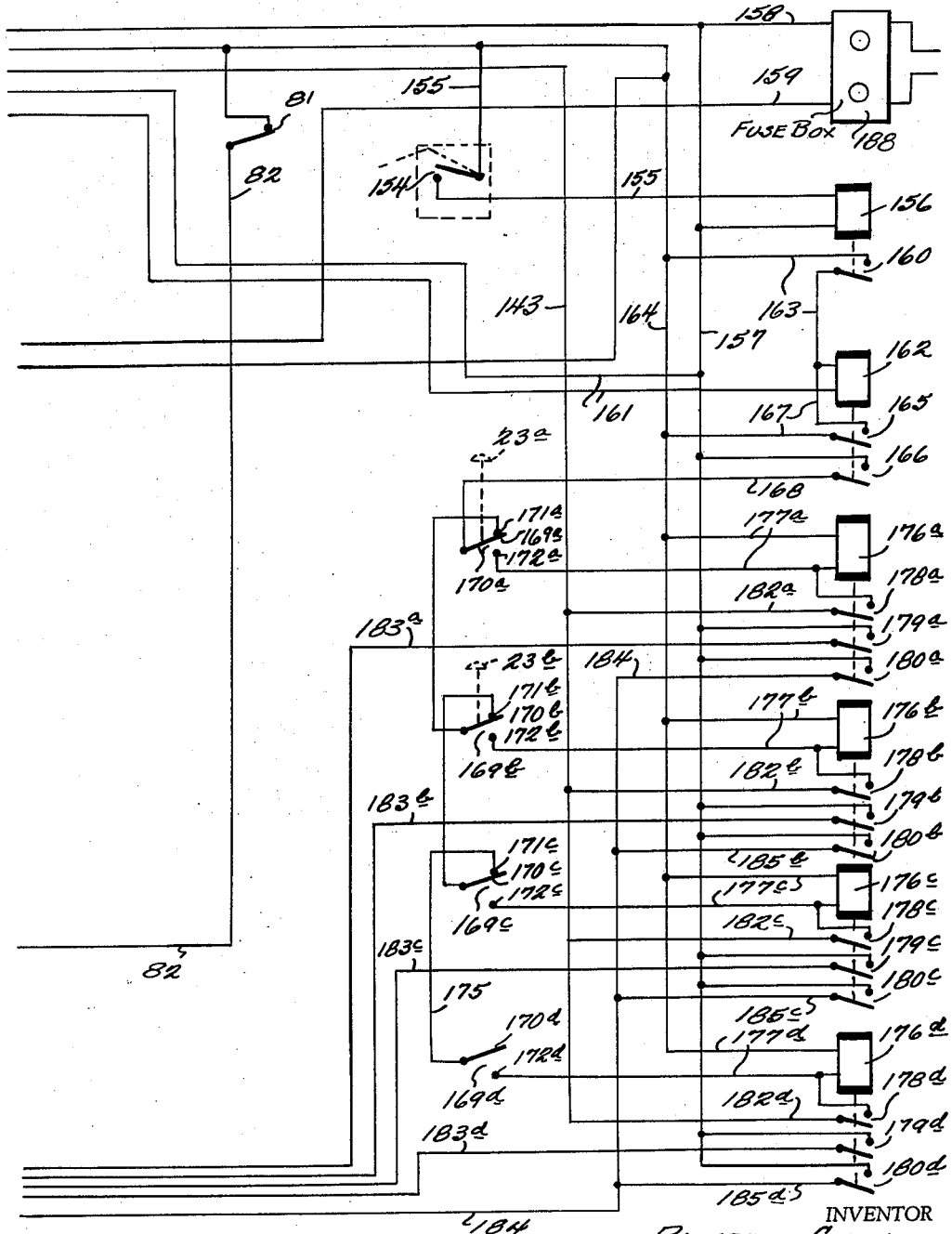

Referring to FIGS. 12–14, a pair of power lines 158 and 159 are connected to a source of electricity. When a purchaser places a coin of suitable denomination into the coin slot 203, the coin momentarily closes a switch 154 connected by leads 155 and 164 to power line 159, lead 164 being also connected to contacts 129, 132, 135, 138 and 141 (FIG. 13) energizing a relay 156 connected to switch 154 by lead 155 and also connected to lead 157 extending to power line 158 and thereby closing the normally open switch 160 connected to lead 164 and by lead 163 to relay 162. Closing of switch 160 energizes the holding relay 162 which in turn closes an associated holding switch 165 connected by leads 167 to leads 163 and 164 and a selector actuator switch 166 connected by lead 168 to contact 170a. These steps are performed substantially instantaneously. The machine is now set to operate upon the selection of a desired syrup. The operator depresses one of the buttons 23a–23h for this purpose.

Assuming the flavor desired relates to button 23a, this button is depressed, operating a selector switch 169a whose movable contact 170a normally engages contact 171a. This moves the contact 170a into engagement with a fixed contact 172a connected by one lead 177a to control relay 176a which is also connected to lead 164. This energizes a control relay 176a and closes switches 178a, 179a, and 180a thereof which are connected to lead 157, switch 178a also being connected by lead 182a to lead 143 connected to contacts 117 and 121 and switch 180a being connected by lead 184 to switches 180b–180d (FIG. 14). The movement of contact 170a out of engagement with fixed contact element 171a of the switch 169a, breaks the circuit to the other selector switches 169b through 169h, so that these switches are inoperative. Therefore, only the flavor controlled by button 23a is dispensed. For purposes of simplicity, only the circuitry for flavors a–d are shown. The selector switches 169b–169d have movable contacts 170b–170d respectively, which normally engage contacts such as 171b and 171c (FIG. 14) and are moved into engagement with fixed contacts 172b–172d respectively by depressing their respective buttons 23b–23d. Lead 175 connects contact 171c to the movable contact 170d, and contacts 171b and 170c are similarly connected, movable contact 170b being similarly connected to fixed contact 171a. Fixed contacts 172b–172d are similarly connected by leads 177b–177d to their respective control relays 176b–176d which are likewise connected to lead 164 and have switches 178–180b, 178c–180c and 178d–180d, respectively. Leads 177b–177d also connect relays 176b–176d to lead 164, and leads 182b–184d connect switches 178b–178d to lead 143, lead 184 also being connected by leads 185b–185d to switches 180b–180d. Leads 183a–183d are connected to switches 179a–179d.

Referring now to the top of FIGS. 12 and 13, there is diagrammatically shown a series of switch operating cams 101–110. These cams are mounted on a common shaft 25' rotated by motor 25.

At the time of making selection, it should be noted that contacts 112 and 114 of a cam-operated switch 111, are open to render the selected valve 78a inoperative during this period; contact 114 being connected by lead 142 to the solenoids of dispensing valves 78a–78h, the solenoids of valves 78a–78d only being shown connected to leads 183a–183d. Also, during this period the holding circuit for relay 162 is closed through contact elements 116 and 118 of the cam-operated switch 115, contacts 116 and 118 being connected by leads 161 to lead 157 and relay 162. Likewise the holding circuit for the control relay 176a is completed through contacts 120 and 121 of the cam-operated switch 119 whose contact 120 is connected by lead 181 to lead 161. However, the circuit through the cup-dispensing mechanism 24 and timer motor 25 is completed, and immediate operation of the cup-dispensing mechanism and motor occurs. The initial energizing circuit for the cup-dispensing mechanism 24 to power leads 158 and 159 will now be described. It may be seen from FIG. 12 that the lower lead 187 extends to a lead 184, which is continued across FIG. 13 to FIG. 14 where it rises vertically and terminates at contacts 180a. It will be recalled that these contacts are closed upon the selection of a flavor, as by the depression of button 23a (FIG. 14), which energized control relay 176a. Thus, the lead 184 is electrically extended through contacts 180a to lead 157, in turn connected to input power lead 158 at the upper right hand side of FIG. 14. The other connection from cup-dispensing mechanism 24 to the other input power lead 159 is made over the upper lead 186 (FIG. 12) from dispenser 24 to the contact 113 of switch 111, which is closed because cam 101 is in its "home" position (prior to energization of motor 25). Thus, a path is completed to power line 159 through contacts 111 such that upon selection of a flavor a cup is dispensed from the dispenser 24.

Since cams 101–110 are being coupled to the timer motor 25, they start rotating immediately. Initial rotary movement of the cam 102 causes operation of switch 115 which moves contact 116 out of engagement with contact 118 and into engagement with contact 117. This breaks the holding circuit to the holding relay 162 and continues the holding circuit to the selected control relay 176a. Cams 102 and 103 are designed so that movable contact 116 moves into engagement with contact element 117 while contact is maintained between elements 120 and 121 of the cam-operated switch 119. Initial rotary movement of the cam 110, on the other hand, causes operation of switch 139 moving the contact 140 into engagement with contact 141. This completes the circuit to vibrators 29 and 30. As previously stated, the vibrators are activated for a pre-determined length of time in order to lessen the chance of an ice jam in the storage hopper. A second function of the vibrators is to insure ice around the shaving blade 16 so that a uniform amount is shaved.

As previously described, this vibration occurs during the period the cup is dispensed and prior to the shaving motor being energized.

The initial rotary movement of cam 108 causes operation of switch 133, moving the contact element 134 into engagement with contact 135, and energizing the circuit breaker 151 connected by lead 197 to power line 158. Energizing the circuit breaker 151 causes movable contact 152 to move out of engagement with contact 153, breaking the circuit to the syrup mixing motors 28a–28h.

Of course, this will have no effect on the circuit during the period the motors (controlled by a time clock) are not operating. However, if a dispensing cycle begins during the time mixing motors are operating, a serious power drain occurs.

Cam 103, at this time, rotates to a point causing contact element 120 to move out of engagement with contact 121 and into engagement with contact 122. This does not alter the status of the electrical circuit at this instant, but readies the circuit for an operation to be described.

Approximately ¾ second after the time interval necessary to allow the cup to drop from its dispensing head 27 to cup-receiving station 33, the cam 110 rotates to a point causing operation of switch 139. Contact 140 moves out of engagement with contact 141, breaking the circuit to the vibrators 29 and 30 through leads 150 and 200 to power line 158, and causing them to de-energize.

At the de-energizing instant, cam 105 rotates to a point causing operation of time delay switch 126 which is connected to lead 164 and by leads 145 and 201, to power line 158, thus energizing the motor 14 of the ice shaving mechanism 13. Cam 105 is constructed so that it will merely touch the activating button on the time delay switch 126. This, however, will be sufficient to energize the time delay switch. Almost immediately after it is energized, cam 105 is rotated to a point out of engagement with the time delay switch until the next succeeding cycle. An air-pressure time delay switch of a conventional adjustable type is set for the period of time necessary to produce one serving of ice. A cam-operated micro switch could be used, but such a switch presents more difficulty in adjustment. After this pre-determined time, the delay switch 126 will automatically open. This will in turn de-energize the motor 14 to the shaving mechanism 13 and stop the shaving process.

The remaining cams are set so that succeeding operations will not take place until the shaving time has elapsed. Approximately one half second after the shaving process is completed, cam 107 rotates to a point where it causes operation of switch 130 moving the contact element 131 into engagement with contact 132 and thus completing the circuit to the push rod solenoid 35 through lead 147 connected to contact 130 and lead 195 connected to power line 158. The structure of the dispensing distribution mechanism is described at this point because of its close relationship with the other control mechanisms.

The basic parts of the syrup dispensing mechanism are mounted on movable tracks 38 slidably received on fixed channel rails 55 attached to the cabinet 1. The movement of tracks 38 and the parts connected thereto are controlled by push rod 36. Upon completion of the circuit to solenoid 35, the solenoid is energized and the push rod is driven forward (to the left in FIG. 9) longitudinally driving the movable parts of the mechanism.

As long as the solenoid is energized the mechanism is urged in this forward position. When forward, syrup dispensing arm nozzle 40 is above the cup of shaved ice at station 33. As nozzle 40 reaches a position over station 33, cam 101 rotates to a point where the contact element 112 moves out of engagement with contact 113 and into engagement with contact 114 completing the circuit to the valve-operating solenoid 78a.

Solenoid 78a opens its associated valve causing delivery of the selected syrup through the conduit 79a. Concurrently, cam 109 rotates to a point causing operation of a switch 136 moving contact 137, which is connected to lead 149 (FIGS. 11 and 13) into engagement with a contact 138. This completes the circuit to motor 41 of the syrup dispensing mechanism 37 which is connected to power line 158. The energizing of this motor causes it to rotate in a counterclockwise direction.

Affixed to shaft 42 of the motor is a wheel 43 rotatable therewith. The wheel is held rigidly in place longitudinally as it rotates by means of ball bearings 44. Around the wheel is an outer race 45 connected to the movable tracks 38. Directly in front of the wheel 43, is a second wheel 46 identically constructed and similarly mounted on tracks 38.

An arm 39 connects the wheels and is secured thereto by anchor pins 50 and 50'. The anchor pins are attached in relatively similar positions with respect to the dispensing arm 39, causing the wheels to rotate at the same rate of speed and in the same direction. To further insure that the two wheels 43 and 46 move together, a cog wheel 49, attached to shaft 42, and a similar cog wheel 49', located beneath wheel 46, are connected by a drive chain 84. As these wheels are rotated by the motor 41, the dispensing head 40 of the syrup dispensing arm 39 follows a circular path 56 above cup 34. As the dispensing head 40 follows the circular path 56 relative to the travel of the wheels 43 and 46, it dispenses and disperses syrup uniformly and equally about the top of the cup. This provides an attractive Sno-Ball for the purchaser.

It is important that arm 39 terminate its cycle at the same point during each sequence. Attached to the motor shaft 42 and beneath the wheel 43 is a cam 51. Movement of the cam is relative to that of the motor shaft 42. The purpose of cam 51 is to operate a micro-switch 52. Shortly after the energization of the motor 41 and the consequent turning of the shaft 42, cam 51 rotates to a point where the contact element 53 of switch 52 engages contact 54 (see FIG. 11) completing a second circuit to motor 41. Refer now to cam 109. Approximately one second after cam 109 energizes switch 136, the cam rotates further along causing contact 137 to disengage contact 138. This, however, will not de-energize the motor 41 since there is still a complete circuit to the motor through switch 52. Therefore, motor 41 stays energized until the shaft 42, the cam 51, and the syrup dispensing arm 39 have made one complete revolution. When one revolution has been completed (the syrup having been spread) the cam 51 will have rotated to a point to cause contact 53 to disengage with contact 54. This breaks the circuit to motor 41, causing it to position arm 39 at the same place at the end of each cycle.

Just before the end of the syrup dispensing cycle, cam 104 rotates to a point causing contact element 124 of switch 123, which is connected by lead 144 to lead 143, to engage contact 125. This causes a circuit to be completed to a cycle counter 57, which is connected by lead 199 to power line 159. A fraction of a second after the counter is energized, cam 104 will have rotated further to a point where it causes arm 124 to disengage with contact 125 and thus break the circuit to the counter.

At the same time switch 123 is activated, cam 106 rotates to a point causing contact 128 of switch 127, which is connected through leads 146 and 198 to power line 158, to engage with contact 129 thus completing a circuit to the spoon dispenser 58. Energizing the spoon dispenser causes a spoon to be dispensed. A moment after cam 106 had activated switch 127, cam 106 will have rotated further to a point where switch 127 is de-activated.

After the time interval for dispensing syrup, cam 101 rotates to a point causing element 112 to move out of engagement with contact 114 and into engagement with the contact 113. This breaks the circuit to the syrup valve 78a, de-energizing the valve and stopping the flow of syrup.

The dispensing of syrup and the rotation of the syrup dispensing arm 39 therefore operate concurrently. A moment after the flow of syrup has stopped, cam 107 will have rotated to a point causing contact 131 to disengage contact 132, thus breaking the circuit to solenoid 35. Consequently, the solenoid will be de-energized and the movable part of the mechanism will be retracted back to its original position prepared for the start of another cycle. The cam 108 rotates to a point causing contact 134 to move out of engagement with contact 135 to de-energize the circuit breaker 151. This, once again, completes the circuit to the syrup mixer motors 28a–28h through the time clock 99. A moment after this, cam 103 causes the movable contact 120 of the switch 119 to move out of engagement with the contact 122 and into engagement with the contact element 121. The holding circuit to the holding relay 176a is broken and the relay is de-energized. Simultaneously the movable contact element 116 of the cam-operated switch 115 is moved into engagement with the contact element 118 to set up the holding circuit for the relay 162 for the next succeeding cycle of operation. De-energization of the relay 176a causes the circuit to the motor 25 to be broken. Timer motor 25 stops since all of the dispensing operations have been completed.

The operations of the control relays 176b–176h, activated by the other buttons 23, are identical with that described in connection with control relay 176a and the selector switch 169a.

It should be noted that the rotation of the cams 101–110, responsive to the closing of a given selector switch, causes the holding circuit for the holding relay to be broken immediately. Therefore, in the event one of the selector switches in the series, after the selector switch 169a is closed, as for instance the selector switch 169d, no actuating circuit can be completed because of de-energization of the holding relay 162, and the consequent opening of the selector actuator switch 166.

Various modifications and changes are contemplated and may obviously be resorted to, without departing from the spirit or scope of the invention as hereinafter defined by the appended claims.

I claim:

1. A food vending machine comprising in combination an ice maker, an ice receptacle receiving ice made by said maker, an ice shaver at the bottom of said receptacle for shaving and dispensing a portion of ice into a container for receiving said portion, a vibrator for striking said receptacle, a syrup dispenser having a dispensing nozzle for placing syrup in said container, and control means activating said vibrator prior to dispensing said portion and prior to dispensing said syrup.

2. A food vending machine comprising in combination an ice maker, an ice receptacle receiving ice made by said maker, an ice shaver at the bottom of said receptacle for shaving and dispensing a portion of ice into a container for receiving said portion, a syrup dispenser having a dispensing nozzle for placing syrup in said container, and means causing relative movement between said nozzle and said container following the dispensing of ice to the container and during the dispensing of syrup whereby syrup is dispensed over said portion of ice.

3. A food vending machine comprising in combination an ice maker, an ice receptacle receiving ice made by said maker, an ice shaver at the bottom of said receptacle for shaving and dispensing a portion of ice into a container for receiving said portion, a syrup dispenser having a dispensing nozzle for placing syrup in said container, means activating the syrup dispenser following the dispensing of a portion of ice into the container and means causing multi-directional movement of said nozzle over said container during the dispensing of syrup from said nozzle.

4. A food vending machine comprising in combination an ice maker, an ice receptacle receiving ice made by said maker, said receptacle having an inward taper near the bottom thereof, an ice shaver at the bottom of said receptacle for shaving and dispensing a portion of ice into a container for receiving said portion, a vibrator mounted on said taper, a syrup dispenser having a dispensing nozzle said dispenser for placing syrup in said container, and control means for sequentially activating said vibrator, dispensing said portion, and dispensing said syrup, and second means for causing relative movement between said nozzle and said container during the dispensing of said syrup.

5. A coin-operated food vending machine comprising in combination a cabinet having an upper compartment and a lower compartment, a food container supply for containers, an ice maker, and a shaving and dispensing assembly housed in said upper compartment, means causing said assembly to dispense a portion of shaved ice in a container supplied by said food container supply, a platform in said lower compartment, a plurality of syrup cylinders on said platform, means slidably supporting said platform in said lower compartment, such that it may be readily removed from said lower compartment, a syrup dispensing nozzle, a plurality of conduits connecting each of said cylinders to said dispensing nozzle, and selective means for closing all of said conduits, except one, to said dispensing nozzle, an air pressure motor, second conduits connecting the output of said motor to each of said cylinders and maintaining them under pressure, mixer means in each of said cylinders, electrical supply leads connected to said mixer means, and a support board adjacent said cylinders for supporting said first and second conduits and said electrical leads.

6. The invention described in claim 5 including means for disconnecting said electrical supply leads from said mixer means during the dispensing of shaved ice caused by said first mentioned means.

7. A food vending machine comprising in combination an ice maker, an ice receptacle receiving ice made by said maker, an ice shaver at the bottom of said receptacle, an ice dispenser depending from said ice shaver for dispensing a portion of ice into a container spaced below said ice dispenser, a syrup dispenser, means to position said syrup dispenser between said ice dispener and said container, said means including further means to remove said syrup dispenser from between said container and said ice dispenser, control means for sequentially activating the ice dispenser, the means to position the syrup dispenser between the ice dispenser and the container and the syrup dispenser to dispense syrup over the portion of ice in the container.

8. A food vendor of the type having an outlet in communication with a passageway to supply a container with food comprising, in combination, means for supplying shaved ice to the container over the passageway; syrup dispensing means for supplying syrup to the container over said passageway; means for moving one of the syrup dispensing means and the ice supplying means into and out of communication with said passageway; said moving means being disposed to move said one of the means to a position between the other of said means and the passageway; and means for rendering the ice supplying means effective to supply ice at a time when it is directly in communication with the passageway and rendering the syrup dispensing means effective for supplying syrup at a time when it is directly in communication with the passageway.

References Cited in the file of this patent
UNITED STATES PATENTS

| | | |
|---|---|---|
| 2,660,351 | Thompson | Nov. 24, 1953 |
| 2,835,410 | Arnett et al. | May 20, 1958 |
| 2,878,968 | Burgoyne | Mar. 24, 1959 |
| 2,953,282 | Peterson | Sept. 20, 1960 |
| 2,984,059 | Hollingsworth | May 16, 1961 |
| 3,036,604 | Donofrio | May 29, 1962 |